United States Patent [19]

Ito

[11] Patent Number: 4,694,347

[45] Date of Patent: Sep. 15, 1987

[54] TELEVISION RECEIVER HAVING A LIQUID CRYSTAL DISPLAY DEVICE

[75] Inventor: Katsu Ito, Tokorozawa, Japan

[73] Assignee: Citizen Watch Co. Ltd., Tokyo, Japan

[21] Appl. No.: 868,715

[22] Filed: May 30, 1986

[30] Foreign Application Priority Data

May 31, 1985 [JP] Japan .................................. 60-118064

[51] Int. Cl.⁴ ............................................... H04N 7/00
[52] U.S. Cl. ..................................... 358/236; 358/241
[58] Field of Search ............... 358/236, 230, 241, 213, 358/254, 194.1, 224; 340/784

[56] References Cited

U.S. PATENT DOCUMENTS

| | | | |
|---|---|---|---|
| 3,824,003 | 7/1974 | Koda | 358/236 |
| 3,967,253 | 6/1976 | Tsuruishi | 358/241 |
| 4,079,413 | 3/1978 | Yamashita | 358/241 |
| 4,392,249 | 7/1983 | Matsuura | 358/195.1 |
| 4,583,122 | 4/1986 | Ohwada | 358/224 |

Primary Examiner—Tommy P. Chin
Attorney, Agent, or Firm—Birch, Stewart, Kolasch & Birch

[57] ABSTRACT

A television receiver has a receiving circuit for producing audio signals and video signals, a liquid crystal display panel, and a driving circuit responsive to the video signals for driving the liquid crystal display panel. The receiving circuit and driving circuit include elements provided on an SOS substrate.

2 Claims, 8 Drawing Figures

TELEVISION RECEIVER HAVING A LIQUID CRYSTAL DISPLAY DEVICE

BACKGROUND OF THE INVENTION

The present invention relates to a television receiver provided with a liquid crystal panel as a video display device.

A portable television receiver with a liquid crystal panel comprises an antenna, receiving circuit block, and liquid crystal panel driving circuit block. In the television receiver, sound and picture carrier waves pass through an antenna, inducing currents. The carrier currents are converted to intermediate-frequencies and amplified by intermediate-frequency amplifiers. The intermediate-frequency signals are detected to provide an audio signal and a video signal. The video signal is fed to the liquid crystal panel driving circuit block for display of a video image. The liquid crystal panel driving circuit composes liquid crystal driving waveforms from the video signal for driving the liquid crystal panel to develop half-tone images.

The receiving circuit block comprises a printed board or ceramic board on which various independent elements or components, including an electronic tuner in a metallic shielding case, and integrated circuits for intermediate-frequency, video signals and audio signals are mounted. The liquid crystal panel driving circuit block is constructed in a similar manner to the receiving circuit block. Namely, an integrated circuit for a liquid crystal panel driving circuit, a liquid crystal panel, and other independent components such as transistors, diodes and capacitors are mounted on a printed-wiring board.

There are many demands on a miniaturized portable liquid crystal television receiver having a small power consumption, small thickness, and high performance. However, there are many difficulties in achieving such improvements. For example, if each component is reduced in size, performance characteristics thereof will be degraded or cost will increase. It is also difficult to mount components on a printed-wiring board at high density by an automatic assembling machine. Further, if wirings are formed on a printed-wiring board at high density, electromagnetic and electrostatic inductions occur in the board, thereby reducing electrical performance of the printed-wiring board.

SUMMARY OF THE INVENTION

The object of the present invention is to provide a television receiver with a liquid crystal panel which may solve the above described difficulties in improving circuit devices of the television receiver.

According to the present invention, there is provided a television receiver having receiving means for producing audio signals and video signals, a liquid crystal display panel, and driving means responsive to the video signals for driving the liquid crystal display panel to display the video signals. The television receiver comprises elements of the receiving means and driving means being provided on an SOS (silicon-on-sapphire) substrate.

In an aspect of the invention, the receiving means includes a gallium arsenide transistor mounted on a sapphire substrate in the SOS substrate, and a surface acoustic wave device as an intermediate-frequency filter, the driving means for the display panel includes switching transistors and voltage holding transistors.

DESCRIPTION OF THE PREFERRED EMBODIMENTS

Figure 1:
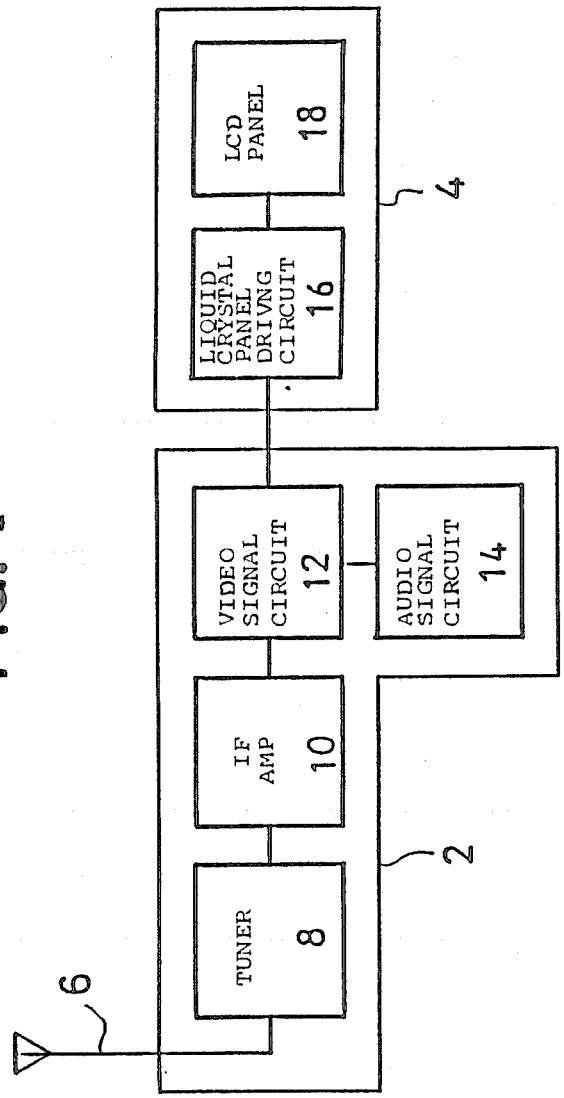
FIG. 1 is a block diagram showing a television receiver with a liquid crystal display device.

Referring to FIG. 1 showing a circuit of a liquid crystal television receiver, the circuit comprises a receiving circuit block 2, a liquid crystal panel driving circuit block 4, and an antenna 6. The receiving circuit block 2 comprises a tuner 8, intermediate-frequency amplifier 10, video signal circuit 12, and audio signal circuit 14. The liquid crystal panel driving circuit block 4 comprises a liquid crystal panel driving circuit 16 and an active matrix liquid crystal display panel 18.

Figure 2:
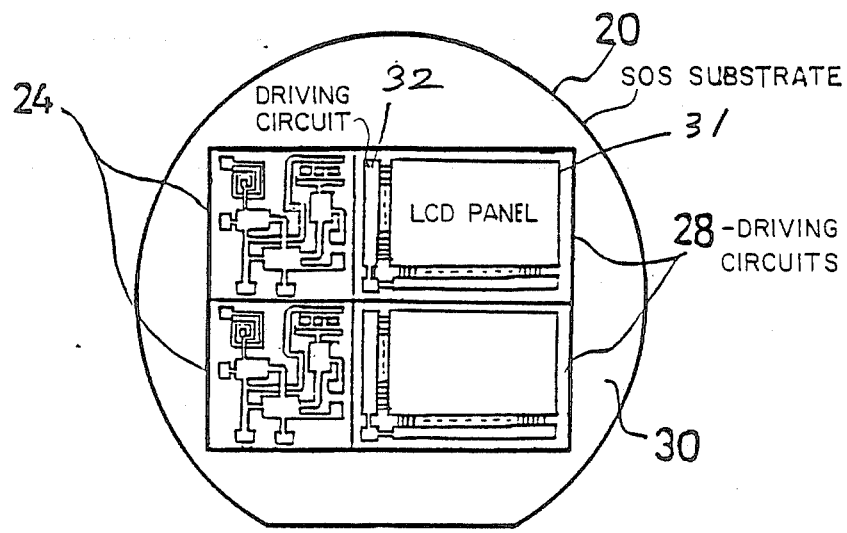
FIG. 2 is a plan view for explaining a method of making circuit devices according to the present invention.

FIG. 2 shows a condition in which circuit blocks are formed on an SOS substrate. On an SOS substrate 20, tuner blocks 24 and liquid crystal panel driving circuit blocks 28 are formed for two sets of television receivers. In the liquid crystal panel driving circuit block 28, a liquid crystal panel 31 and a liquid crystal panel driving circuit 32 are provided.

Figure 3:
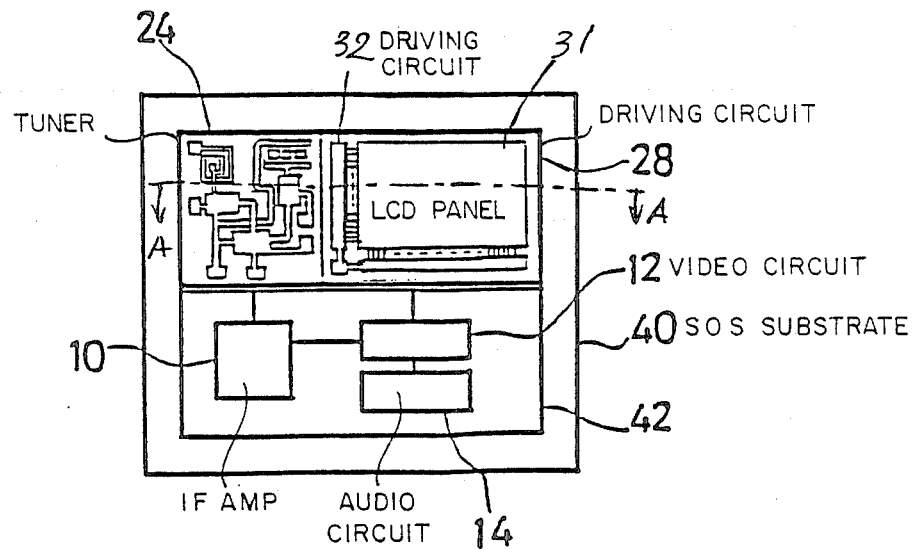
FIG. 3 is a schematic plan view showing a television receiver according to the present invention.

FIG. 3 shows a circuit block for a liquid crystal television receiver. The tuner block 24 and liquid crystal panel driving circuit block 28 shown in FIG. 2 are taken out from the SOS substrate 20 by removing a remainder 30 and mounted on a printed-wiring board 42 provided in a case 40. On the printed-wiring board 42, the intermediate-frequency amplifier 10, video signal circuit 12, and audio signal circuit 14 are mounted. If there are components in the circuits 10, 12 and 14, which can be mounted in the blocks 24 and 28, the components are mounted on the block 24 or 28.

Figure 4:
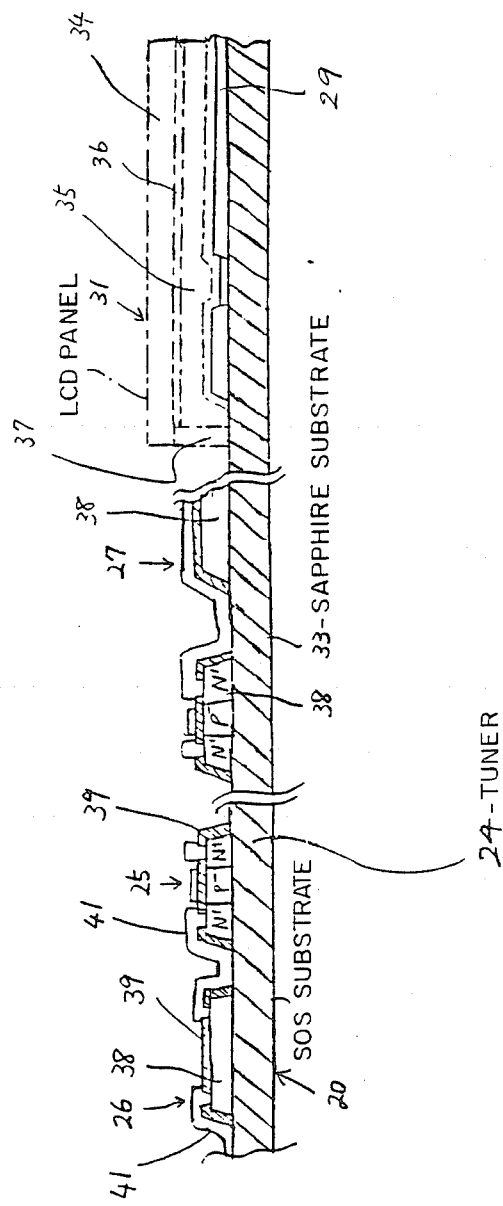
FIG. 4 is an enlarged sectional view taken along a line A—A of FIG. 3.

As shown in FIG. 4, a silicon layer 38 of the SOS substrate 20 is etched to form islands at necessary positions. In the tuner block 24, active elements such as field effect transistors 25, and passive elements such as resistor 26 and capacitor 27 are provided. Each of these elements is made by using the island of silicon layer 38 and coated with an insulation material 39 and connected to other elements by electrodes 41. The liquid crystal panel 31 is mounted on a sapphire substrate 33 of the SOS substrate 20. The liquid crystal panel comprises a lower substrate 29, glass 34, liquid crystal material 35, electrode 36 and sealing member 37.

The sapphire substrate has a very high resistivity, stable dielectric constant and mechanical strength against variations of temperature and frequency, and high dielectric constant and thermal conductivity, non-reactivity (high anticorrosive quality). These characteristics are advantageous for constructing a hybrid integrated circuit. Further, since the SOS substrate has a very small capacitance between wirings or electrodes and the substrate, it is possible to provide a circuit having a high operating speed and a low power consumption compared with a circuit provided on a bulk silicon substrate. It is further possible to form a spiral coil on the SOS substrate with a high accuracy measurement, which allows the spiral coil to be used as a high-frequency choke coil for a tuner, especially a tuner for the VHF and UHF bands which are very high frequency bands. Thus, it is possible to make a very small television receiver with a liquid crystal display panel. In addition, since the sapphire plate is transparent, a liquid crystal panel provided on the sapphire substrate is available for a light-transmission type liquid crystal television.

Although, in the circuit of FIG. 3, the tuner and liquid crystal display panel driving circuit are formed on the SOS substrate, the intermediate-frequency amplifier 10, video signal circuit 12 and audio signal circuit 14 can also be formed on the SOS substrate. However, generally a passive element such as a coil and capacitor becomes large in size as the frequency of signal applied to the element becomes low. It is difficult or disadvantageous to mount large elements on the SOS substrate. Accordingly, such elements are mounted on a printed-wiring board provided outside the SOS substrate and electrically connected to circuits on the substrate.

Figure 5:
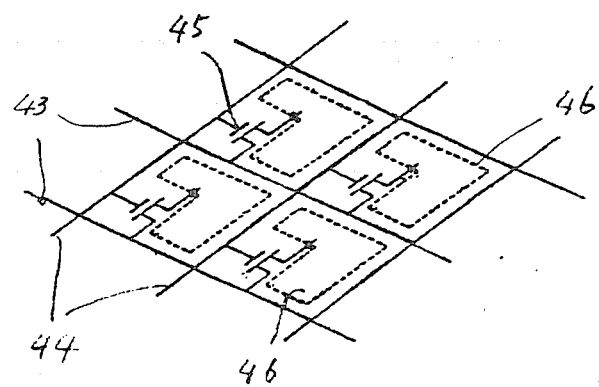
FIG. 5 shows a part of an active matrix liquid crystal display panel.

FIG. 5 shows a part of an active matrix liquid crystal display panel formed on the lower substrate 29. The panel includes a plurality of data electrodes 43, scanning electrodes 44, switching transistors 45 and electrodes 46 of liquid crystal. The switching transistor 45 is turned on by a timing signal on the corresponding scanning electrode 44, so that data signal on the data electrode 43 is applied to the electrode 46 of liquid crystal in a picture element. Thus, the liquid crystal in the picture element is driven.

Figure 6:
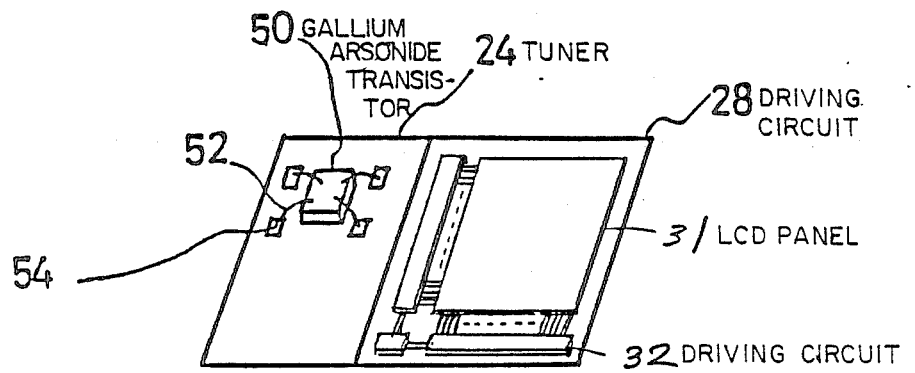
FIGS. 6 to 8 are perspective views showing other embodiments of the present invention.

Referring to FIG. 6 showing another embodiment of the present invention, a chip 50 of gallium arsenide trsnsistor is mounted on the sapphire substrate of the tuner 24 and electrodes on the chip 50 are connected to aluminum pads 54 on the sapphire substrate by bonding wires 52 to form a hybrid integrated circuit. Since the bonding wire 52 is tubular, the wire has an inductance which is available in the tuner as an effective inductance. If the gallium arsenide transistor is used as an element of a high frequency amplifier in an input stage of the tuner, reduction of noise and decrease of power consumption can be achieved.

Figure 7:
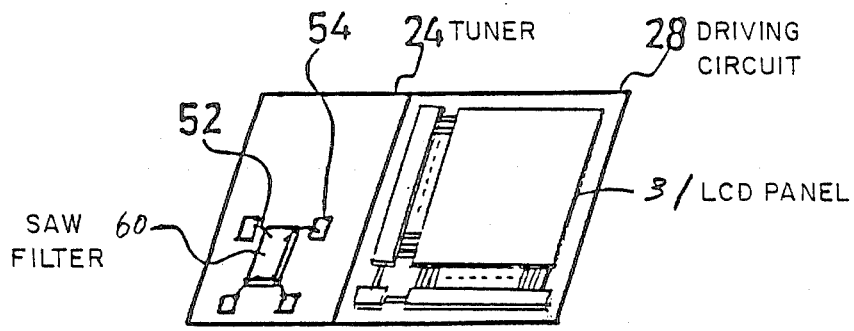

In an embodiment of FIG. 7, a surface acoustic wave device 60 as an intermediate-frequency filter is mounted on the sapphire substrate to form a hybrid integrated circuit. The surface acoustic wave device is in the form of a chip using lithium niobate as a substrate and connected to pads on the sapphire substrate by bonding wires like FIG. 6.

Figure 8:
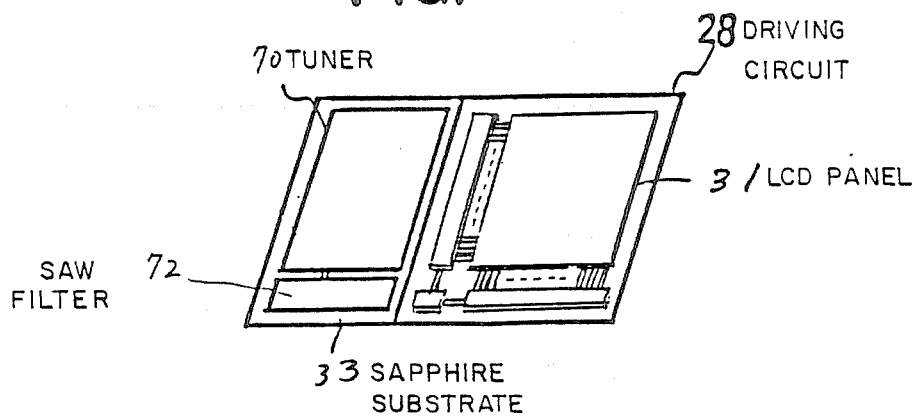

Referring to FIG. 8 showing a further embodiment of the present invention, a thin film surface acoustic wave device 72 is formed on the sapphire substrate 23 outside an integrated tuner circuit 70 and connected to an output circuit in the tuner circuit. The thin film surface acoustic wave device is formed by providing comb shaped electrodes on a piezoelectric thin film deposited on the sapphire substrate by proper method for example by sputtering or chemical vapor deposition. By forming the surface wave device on the piezoelectric thin film deposited on the sapphire substrate, the tuner block can be reduced in size compared with a tuner block in which a surface wave device is formed on a piezoelectric crystal substrate.

From the foregoing, it will be understood that the present invention provides a small television receiver having a small thickness, high performance and low power consumption.

While the invention has been described in conjunction with preferred specific embodiments thereof, it will be understood that this description is intended to illustrate and not limit the scope of the invention, which is defined by the following claims.

What is claimed is:
1. A television receiver comprising:
  a transparent SOS substrate;
  a liquid crystal display panel provided on a sapphire portion of the SOS substrate;
  receiving means, including an intermediate-frequency amplifier, video signal circuit and audio signal circuit, for producing audio signals and video signals;
  driving means responsive to the video signals for driving the liquid crystal display panel to display images represented by said video signals;
  said intermediate-frequency amplifier, video signal circuit and audio signal circuit of the receiving means and active elements of the driving means being monolithically mounted on the SOS substrate at a portion lateral of the liquid crystal display panel;
  said receiving means including a gallium arsenide transistor mounted on said SOS substrate as an element of a high frequency amplifier;
  said receiving means further including a surface acoustic wave device as an intermediate-frequency filter, the surface acoustic wave device being mounted on said SOS substrate.

2. The television receiver according to claim 1 wherein said surface acoustic wave device comprises a piezoelectric thin film deposited on a sapphire substrate in said SOS substrate and electrodes provided on the piezeoelectric thin film.

* * * * *